June 28, 1966     R. W. VANHOESEN ETAL     3,257,839
RECIPROCITY CALIBRATION OF LOW FREQUENCY RANGE
RECORDING HYDROPHONES IN SITU
Filed Dec. 27, 1962     2 Sheets-Sheet 1

INVENTORS
RICHARD W. VANHOESEN, DECE. BY
FRANCES R. VANHOESEN, ADMIN.
BY AND MARVIN S. WEINSTEIN.

*Albert Hopp*

AGENT.

INVENTORS
RICHARD W. VANHOESEN, DECE. BY
FRANCES R. VANHOESEN, ADMIN.
BY AND MARVIN S. WEINSTEIN.

AGENT.

United States Patent Office 3,257,839
Patented June 28, 1966

3,257,839
RECIPROCITY CALIBRATION OF LOW FREQUENCY RANGE RECORDING HYDROPHONES IN SITU
Richard W. Van Hoesen, deceased, late of Montgomery County, Md., by Frances R. Van Hoesen, administratrix, Montgomery County, Md., and Marvin S. Weinstein, Montgomery County, Md., assignors, by mesne assignments, to the United States of America as represented by the Secretary of the Navy
Filed Dec. 27, 1962, Ser. No. 248,843
22 Claims. (Cl. 73—1)

This invention relates to the calibration of compressional wave devices, and more particularly, relates to the calibration of low frequency range recording hydrophones in situ.

As under water detection devices such as hydrophones have become more sophisticated, it has become increasingly necessary to accurately calibrate such devices and acoustic receiving or recording systems related thereto. Adequate techniques have been developed to calibrate essentially all portions of the systems in situ except for the compressional wave detection device or hydrophone itself. The difficulty in calibrating hydrophones arises from the need to produce an accurately known acoustic or compressional wave signal. Previous known techniques include the towing of an accurately calibrated source over the range in which the hydrophone is to be tested, the placement of a known source in the vicinity of the range, or the use of a calibration chamber carried by a diver. However, these systems are either impractical, inaccurate, or both.

It is apparent that in prior art systems for calibration of hydrophones, the mere fact that the distance from the acoustic source to the hydrophone to be calibrated is relatively large means that the level of the calibrating signal at the hydrophone cannot be accurately predicted. In those cases where the best possible accuracy is desired, it is usually necessary to remove the hydrophones from their operational environment and to carry out the testing in the laboratory. Of course this is expensive and time consuming because the hydrophones must be removed for calibration and later replaced.

Accordingly, it is among the objects of the present invention to provide for the calibration of the acoustic devices at locations where they are being operationally employed.

Another object of this invention is to provide for the reciprocity calibration of hydrophones in situ.

Yet another object of this invention is the provision of calibration of hydrophones in situ and of minimizing the effects of ambient noise during this calibration.

Another object of the present invention is the provision of means for controlling the reciprocity calibration of hydrophones while located in their operational environment at any time.

Another object of the present invention is to provide a reciprocity calibration testing unit free from deleterious effects of intervening natural reflection surfaces.

These and other objects, features and advantages of the present invention will be better understood by referring to the accompanying drawings in which like reference numerals indicate like elements and in which.

Figure 1:
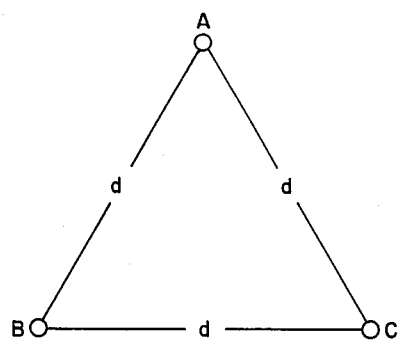
FIG. 1 is an explanatory diagram to facilitate explanation of the invention.

Referring to FIG. 1, the letter A indicates an operational range hydrophone which is to be employed for ordinary range detection, and which is the hydrophone to be calibrated. A second hydrophone B and a third hydrophone C are located in close proximity to the hydrophone A and are equidistant from hydrophone A and from each other so that all of the hydrophones are separately from each other by a distance indicated as $d$. The radiation pattern of each respective hydrophone is cylindrically symmetrical, and they have nearly identical high sensitivity and low capacity. According to the present invention, the range hydrophone A may be calibrated essentially by the following method: (1) the hydrophone C is driven, and the outputs of the hydrophones A and B are measured to produce output voltages $E_a$ and $E_b$ respectively; (2) the hydrophone B is driven with a current $I_b$, which is measured across a precision resistor, and the output of the hydrophone A is measured as $E_a'$.

The parameters $E_a$, $E_b$, $I_b$ and $F_a'$ produced under the foregoing conditions may be utilized in the calculation of the sensitivity of the hydrophone A according to the general electroacoustic reciprocity thereon. This is discussed on pages 355 through 358 in Fundamentals of Acoustics by Kinsler and Frey, published by John Wiley and Sons, Inc., 1959. In mathematical form this general reciprocity principle may be stated as $$M/S = 2d\lambda/(pc \times 10^7) \qquad (1)$$

where M is the free field microphone response of a transducer expressed in volts/dyne/cm.$^2$; S is its speaker or receptor response expressed in dynes/cm.$^2$/ampere; $d$ is the distance between transducers; $pc$ is the specific acoustic resistance of the medium, and $\lambda$ is the wave length being transmitted. The right hand term of equation (1) is called the reciprocity constant.

The sensitivity $M_a$ of the hydrophone A, then may be expressed as $$M_a = \left[\frac{E_a E_a' \times 2d\lambda \times 10^{-7}}{E_b I_b pc}\right]^{1/2} \text{ volts/dyne/cm.}^2 \qquad (2)$$

where $E_a$ is the voltage output of hydrophone A when driven by hydrophone C; $E_a'$ is the voltage output of hydrophone A when driven by hydrophone B thru a resistance, $E_b$ is the voltage output of hydrophone B when driven by hydrophone C; and $I_b$ is the current thru a resistance R in series with the hydrophone B when driven by a calibration generator.

If the sensitivity of each of the hydrophones is equal, that is, $M_a$ is equal to $M_b$ is equal to $M_c$, and the hydrophone impedances are equal, that is, $/Z_a/$ is equal $/Z_b/$ is equal to $/Z_c/$ is equal to $1/2\pi fc$, then $E_a$ is equal to $E_b$, and the following equation is obtained:

$$M = \left[\frac{2E_a' d\lambda \cdot 10^{-7}}{I_b pc}\right]^{1/2} \qquad (3)$$

For water, the constant $p$ is equal to 1 and $f=c$, and the following equation is obtained:

$$M_a = \left[\frac{2dE_a' \cdot 10^{-7}}{I_b f}\right]^{1/2} \qquad (4)$$

If $E_a'$ is equal to $M_a$ where S is the signal level produced by $I_b$ at hydrophone A, the following equation is obtained:

$$M_a = \left[\frac{2dSM_a \cdot 10^{-7}}{I_b f}\right]^{1/2} \text{ volts} \qquad (5)$$

since $$/Z_b/ = 1/(Z\pi fc) \text{ and } I_b = E/(Z\pi fc)$$

then $$E = (dS \cdot 10^{-7})/(\pi f^2 c M_a) \qquad (6)$$

In applying the foregoing equations to the calibration of a typical recording range hydrophone, such as hydrophone model RX–100 manufactured by the Research Manufacturing Co. of San Diego, California, which has a sensitivity of about 200 microvolts per dyne per centimeter and a capacitance of about 200 micromicrofarads; and where the hydrophone housing diameter is about 6.5 centimeter so that the distance between each of the hydrophones is about 7.5 centimeters, the following calculation results:

$$E = \frac{S \times 7.5}{3.14 f^2 \times 2000 \times 10^{-12} \times 200 \times 10^6 \times 10^7}$$

$$= 6.0 \times 10^6 \frac{S}{f^2} \text{ volts} \qquad (7)$$

At a frequency of about 100 cycles per second, the ambient sea noise level is typically of the order of 10 to 20 decibels re one dyne/cm.$^2$ for a narrow frequency band of the order of two cycles per second. A signal level of one dyne/cm.$^2$ is seen to be adequate for sensitivity measurements. Therefore;

$$E = 6.0 \times 10^6/f^2 = 6.0 \times 10^6/150^2 = 265 \text{ volts} \qquad (8)$$

As forecast by the above equation, it has been found in actual practice that with existing hydrophones reciprocity calibrations may be carried out down to 150 cycles per second.

If the ratio of hydrophone diameter to spacing between each of the hydrophones is small so that spherical wavefronts are presented thereto, and the hydrophones are located near the sea bottom, then errors will result in the case where absolute measurements are being sought. However, according to the present invention, absolute measurements are not required. The recording range hydrophone A is first calibrated in the laboratory before use. Then, the array including hydrophones A, B and C is assembled, and during the period of its operational use in situ, hydrophone A is calibrated by the reciprocity method just described. A difference in results between laboratory and in situ calibration may then be compensated for by a correction constant K for plane waves. Taking into account this correction, the sensitivity of the hydrophone A is given by the following equation:

$$M_a = K \left[ \frac{E_a E_a' \cdot 2 d \lambda}{E_b I_b p c \cdot 110^7} \right]^{1/2} \text{ volts/dyne/cm.}^2 \qquad (9)$$

If $d = 7.0$ cm.; $p = .976$ (Dow-Corning 200 Fluid—1000 centistokes viscosity), and $\lambda = c/f$, then $$M_a = K \left[ \frac{14.4 E_a E_a' \cdot 10^{-7}}{E_b I_b f} \right]^{1/2} \qquad (10)$$

However, for the particular, close arrangement of the hydrophones according to the invention, reciprocity correction constant K' for spherical waves must be employed. K may be related to K' as follows:

$$K' = K \left[ \frac{2 d \lambda}{p c 10^{-7}} \right]^{1/2} = \frac{M_a}{\left[ \frac{E_a E_a'}{E_b I_b} \right]^{1/2}}$$

The constants K or K' are determined experimentally by first calibrating the hydrophone A in the laboratory by any suitable means. The hydrophone A is then calibrated in water using the reciprocity procedure to obtain the four parameters $E_a$, $E_b$, $I_b$ and $E_a'$. Either constant K or K' may be calculated according to Equations (10) or (11), for example, and then may be applied to the hydrophone when calibrated periodically in situ according to the invention.

Figure 2:
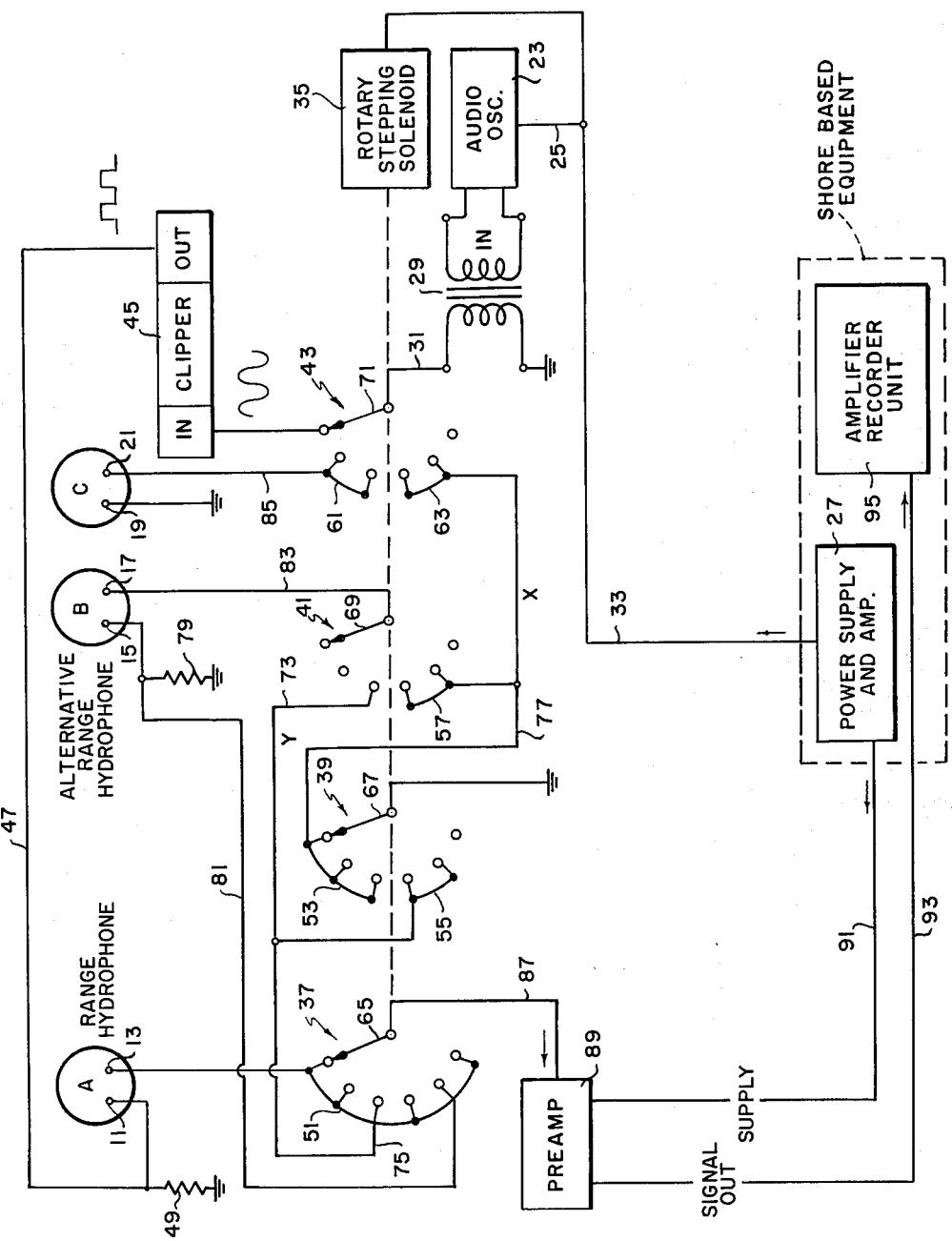
FIG. 2 is a schematic circuit diagram according to an embodiment of the invention.

Reference is now made to FIG. 2 in which is shown the calibration equipment according to an embodiment of the invention. The three hydrophones A, B and C are located in the portions shown only for convenience in explaining the schematic diagram. However, it is to be understood that in actual practice the hydrophones A, B and C are geometrically arranged as shown in FIG. 1. For example, in a working model, the high impedance hydrophones A, B and C are cylindrical in form and symmetrically arranged 120 degrees apart in a circle with a diameter of approximately 8 centimeters. The center-to-center spacing between the hydrophones is approximately 7 centimeters. All of the hydrophones may be placed in a watertight container which is completely filled with an insulating fluid such as Dow Corning 200 fluid (electrical grade) with a viscosity of about 1,000 centistokes. The primary purpose of the fluid is to prevent sea growth inside the unit.

The hydrophones A, B and C are individually electrostatically shielded and encapsulated in an epoxy resin and are acoustically isolated from their common support by any suitable means such as integrally molded rubber supports. The rubber supports and the Dow Corning fluid (which is a heavy silicon oil) provide a well damped system mechanically decoupling the hydrophones. Any cables used in the system are preferably low capacity, double shielded cables.

The range hydrophone A has two terminals 11 and 13 respectively connected to its detector so that the hydrophone A may be driven by a locally generated source of audio frequency. The hydrophone B has a pair of terminals 15 and 17 respectively, and the hydrophone C has a pair of terminals 19 and 21 respectively.

As part of the underwater unit including the three hydrophones A, B, and C, there is provided a calibration generator such as an audio oscillator 23 having an input lead 25 which may be any suitable watertightly sealed cable connecting the audio oscillator to a suitable source 27 of shore power. If desired, the oscillator 23 may be located on shore and connected to the array by cables. The audio oscillator 23 is coupled through a drive coupling transformer 29 having a grounded secondary winding to provide an audio frequency calibration signal on a lead 31.

A lead 33 connects the shore power amplifier 27 to a rotary stepping solenoid 35 which is part of the underwater testing equipment. The rotary stepping solenoid 35 actuates four ganged rotary multiterminal stepping switches including an output switch 37, an input switch 43, an intermediate switch 41, and a dummy switch 39, for simultaneous movement in unison. Each of the stepping switches 37 thru 43 has six positions or terminals which are identically numbered 1 thru 6 for each switch. The terminal 1 of the input switch 43 is connected to the input side of a clipper circuit 45 of any suitable design. The output of the clipper 45 is in the form of square waves and is coupled via a lead 47 to the terminal 11 of the range hydrophone A. The lead 47 is also connected to ground via a 1K resistor 49 of high impedance in comparison with the impedance of hydrophone A.

In the rotary output stepping switch 37, a lead 51 is connected to each of the terminals 1, 2, 4, and 6 thereof. The terminals of the switch 39 are dummy terminals, and in the dummy switch 39, a lead 53 is connected to each of the terminals 1, 2, and 3, and a lead 55 is connected to each of the terminals 4 and 5. In the switch 41, a lead 57 is connected to each of the terminals 4 and 5; in the switch 43, a lead 61 connects terminals 2 and 3, and a lead 63 connects terminals 4 and 5. The rotary switch arms for the respective switches 37 thru 43 are designated as 65, 67, 69, and 71 respectively. The rotary switch arms 65 thru 71 are, of course, stepped by the rotary stepping solenoid 35, so that the respective identically numbered terminals of the respective switches will be engaged in unison simultaneously by the respective switch arms.

A lead 73 connects the terminal 3 of the switch 41 to the terminal 4 of the switch 39; a lead 75 connects both the terminals 3 of the switch 41 and the terminal 4 of the switch 39 to the terminal 3 of the switch 37. A lead 77 connects the terminal 1 of the switch 39 to the terminal 5 of the switch 41 and then to the terminal 5 of the switch 43.

The terminal 15 of the hydrophone B is connected to ground via a precision high resistance 79 and is also connected via a lead 81 to the terminal 5 of the switch 37. The other terminal 17 of the hydrophone B is connected to the switch arm 69 via a lead 83. A lead 85 connects the terminal 21 of the hydrophone C to the terminal lead 61 of the switch 43. The lead 19 of the hydrophone C, and the arm 67 of the switch 39 are connected to ground. The arm 65 of the switch 37 is connected via a lead 87 to a preamplifier 89 which is also a part of the underwater testing equipment.

Suitable biasing controls for the preamplifier 89 and controls for the rotary stepping solenoid 35 are supplied from the shore power amplifier 27 via a suitable cable 91. The preamplifier 89 may be of any suitable design having a high impedance input end and which is capable of attenuating frequencies below about 5 cycles per second and above approximately 3 or 4 kilocycles—in other words attenuating all signals which are not in the operational range of the hydrophone being tested. Thus in the operating frequency of the range hydrophone A, the preamplifier 89 presents an output of low impedance amplification to pass an output signal therefrom via a lead 93 to suitable signal processing equipment such as a shore amplifier and recording unit 95 located on shore. It is to be understood that the shore amplifier recording unit 95 may be of any suitable well known construction for the purpose of recording on some suitable medium such as magnetic tape or stylus paper an output signal from the preamplifier 89.

Figure 3:
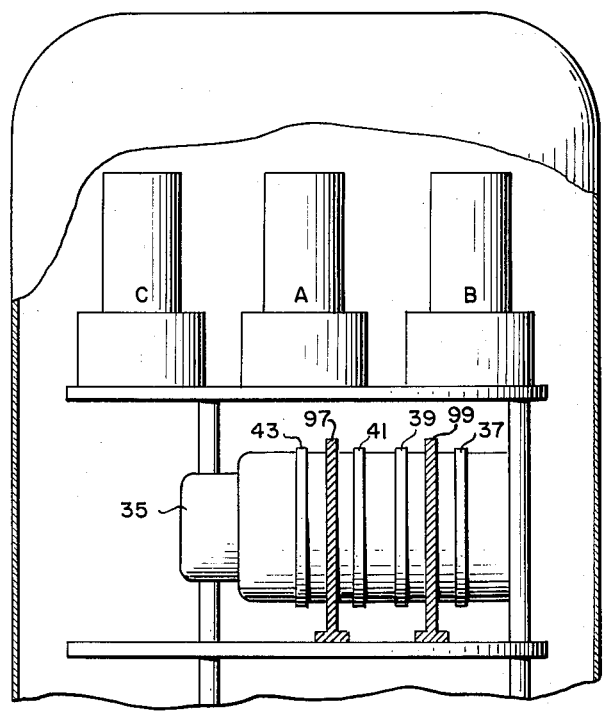
FIG. 3 is a modified view in elevation of a reciprocity calibration testing unit according to an embodiment of the invention.

It is to be understood that the rotary switches 37 thru 43 may be advantageously constructed in the form of switch wafers stacked or cascaded as shown in FIG. 3 to provide a compact underwater unit.

As shown in FIG. 3, which is a modified view of the hydrophone calibration unit in elevation, (the electrical connections having been omitted for simplicity), the switching wafers 37, 39, 41 and 43 on which the various terminals are located are shown mounted in a tandem, ganged relationship. The rotary stepping solenoid unit 35 is shown in its position adjacent the switching wafer 43. An electrostatic shield 97, which may be in the form of a plate and made of any suitable material such as aluminum, is mounted between the switching wafers 43 and 41, and an electrostatic shield 99 of similar construction is located between the wafers 39 and 37. The shields 97 and 99 serve to eliminate at least a portion of stray coupling between the relatively high voltage input driving end at wafer 43 and the relatively low voltage output end at wafer 37.

It has been found that in such stacked construction, despite shielding, there is still a tendency for high amplitude, low frequency inputs to overload the system because of stray coupling between the switching unit 37 and the unit 43. For example, typical voltage levels which are coupled into the system through the driving transformer 29 and the switch 43 are of the order of 300 volts, while the output voltage levels on the lead 87 are in the millivolt range. Consequently with the stacked wafer or similar compact construction, the driving voltage has a tendency to be coupled into the output lead 87. It is for the purpose of eliminating or isolating these stray coupling voltages that the dummy wafer switch 41 affording grounding interconnections for leads not in use is provided in the stacked arrangement between the switches 37 and 43. It has been found that unless shielding and grounding and disconnecting means for elimination or isolation of cross talk and stray coupling are employed, the efficiency of the calibration system is very much reduced.

It is further understood that the rotary stepping solenoid 35 may be actuated by any suitable means located on the shore for example, such as an actuating capacitor located in the shore power supply amplifier unit 27. As is well known, when a charge builds up in a capacitor to a sufficiently high voltage to energize the winding of the solenoid so that the solenoid is moved from position to position.

In operation, when the hydrophone array A, B, and C is lowered into the sea for in situ operation, it may be at that time noticed that the sensitivity of hydrophone A changes as a function of depth. This effect may be discounted in the laboratory either by adjustment or other appropriate compensation. Assuming, as in the practical case, that such changes occur and cannot be attributed to changes in hydrophone sensitivity as a function of depth, then it may be assumed that the changes are caused by reflections causing changes in the transmission path which have already been compensated for by the correction constants K or K'.

If there is a drastic change noted during the descent of the array, then it may be safely assumed that either damage to the array has occurred or that the unit has been placed next to an uneven reflecting surface, for example, a bottom having a rocky formation such as coral. By trial and error in lowering the array, it may thus be determined that the surface near which the array is finally positioned is regular and symmetric in relation thereto when no such drastic change is observed.

Thus, if it is observed that the parameters change during descent, it may be assumed that damage to the array has occurred. If there is no relatively slight change in the parameters during descent, but a drastic change in parameters at some point during descent or when the array is finally positioned, then such change must be caused by the nearby presence of a reflecting surface. If, after the array has been lowered and positioned, no changes are observed then the unit may be operated from then on and periodic in situ calibration carried out.

The in situ calibration procedure according to the invention is initiated with the switch arm 65 thru 71 occupying the positions shown in FIG. 2, that is, with the switch arms contacting the respective terminals 1 of the switches. In this position a calibration generation audio oscillation at a freqeuncy in the operating range of the respective hydrophones is coupled through the driving transformer 29 to the switch arm 71 and thus into the input side of the clipper 45. The essentially sinusoidal waveform is clipped in the clipper 45 to produce square shaped pulses on the output lead 47, and these pulses are coupled to the input terminal 11 of the range hydrophone A. The pulses pass through the detecting equipment in the hydrophone A, output terminal 13 and arm 63 to the input lead 37 to the preamplifier 89. The output of the preamplifier 89 is then fed into the cable 93 connecting the underwater unit to the shore amplifier and recording unit 95. Thus the square wave voltage passes through the hydrophone A and the preamplifier 89 in the underwater equipment, as well as the shore amplifier and recording unit 95 so that the preamplifier may be initially calibrated in terms of its gain. The resulting signal output will, of course, be recorded in the unit 95.

The purpose of the 1K resistance 49 which, it will be recalled, is of high impedance in comparison with the impedance of the hydrophone A, is to insure that changes in the impedance of the hydrophone A do not affect the gain of the preamplifier 89. Thus, with the switch arms in position 1, the gain of the preamplifier 89 may be accurately ascertained at all operating frequencies and appropriately processed for later corrective application to the various parameters as the parameters are measured and recorded.

The switch arm 65 thru 71 are now stepped by the rotary stepping solenoid 35 to engage the terminals 2 of the respective switch units. In this position the hydrophone C is driven through the drive transformer 29 via the lead 85, and the resulting output of the hydrophone A which produces an output via acoustic coupling between the hydrophone A and C, is coupled via the lead 51, terminal 2, and arm 65 of the unit 37 to the preamplifier 89 and then through the cable 93 to the recording unit 95. This output which may be represented by $E_a$ is then recorded in the recording unit 95.

The arms of the switch units are then stepped to engage the terminals 3 of the respective switch units. In this position, the hydrophone C is connected to the drive transformer 29 via leads 61 and 85. The output $E_b$ of the hydrophone B appears on the lead 83 and is fed via the switch arm 69 to the leads 73, 75 and thence through switch arm 63 to the preamplifier 89. The signal $E_b$ as received at the input of the shore amplifier and recording unit 95 is then recorded.

With the switch arms engaging terminals 4 of the respective switch units, the hydrophone B is driven through the arm 71 leads 63, 77, and 57, switch arm 69 and lead 83. The output $E_a'$ of the hydrophone A as received at the input of the unit 95 is then recorded.

With the switch arms connected to engage the terminals 5 of the respective switches, the hydrophone B is connected to the drive transformer 29 via the leads 63 and 77 and the switch arm 69. The terminal 15 of the hydrophone B is connected via lead 81 and terminal 5 of the switch 37 to the switch arm 63 and lead 87, and the voltage $E_b$ across the precision resistor 79, thus determining $I_b$ by Ohm's Law, is received at the input of the shore amplifier recording unit 95. The resulting recorded measured parameters are then converted from the recorder in any suitable manner, and the sensitivity is calculated according to Equation 9.

The terminal position 6 of the respective switches is for ordinary range recording of an external acoustic signal received at range hydrophone A. In this position the range audio oscillator is completely disconnected from the shore power supply amplifier 27 so that only underwater signals in the range for which the hydrophone A is designed to detect, such as passing ships, submarines, and so forth, are fed from the terminal 13 thereof via the lead 51 to the switch arm 63 of the switch unit 37. The detected signals are then fed through the preamplifier unit 89 to the shore amplifier and recording unit 95.

In an emergency situation, the hydrophone B may be used as a range hydrophone. With the switch in position 3 and with all of the calibrating signals turned off, the hydrophone B as the range hydrophone supplies an output via the lead 83 and the lead 73 to arm 63 and lead 87 to the preamplifier 89. Although the hydrophone B cannot be calibrated in situ as can hydrophone A, its sensitivity may be directly compared with that of the calibrated hydrophone A by driving the hydrophone C, and obtaining an approximate measure of the sensitivity of the hydrophone B therefrom.

Obviously many modifications and variations of the present invention are possible in the light of the above teachings. It is therefore to be understood that within the scope of the appended claims the invention may be practiced otherwise than as specifically described.

What is claimed is:
1. A hydrophone calibration system comprising:
input calibration signal driving means;
a first hydrophone to be calibrated;
second and third hydrophones located in close enough proximity to each other and to said first hydrophone to eliminate natural intervening reflecting surfaces therebetween said first, second and third hydrophones each being located equidistant from each other;
output signal processing means; and
switch means for selectively connecting each of said hydrophones to said input drive means and for selectively connecting said first and second hydrophones to said output signal processing means;
whereby said hydrophones may be switched in relation to each other and to said input and output means to produce parameters appearing as output signals which are determinative of the sensitivity of said first hydrophone.

2. The invention as defined according to claim 1 but further characterized by said switch means including isolating switching means for isolating stray coupling between said input and output means.

3. The system as defined according to claim 2 but futher characterized by said switching means including electrostatic shielding means located therein to further prevent stray coupling between said input and output means.

4. A hydrophone calibration system for providing in situ calibration of a range hydrophone comprising:
first and second hydrophones located in close enough proximity to each other and to said range hydrophone to eliminate intervening natural reflecting surfaces therebetween;
input signal drive means for supplying signals to said hydrophones;
output signal processing means;
and switching means for selectively connecting each of said hydrophones to said input means and for connecting said range hydrophone and said first hydrophone to said output means only in predetermined driving and detecting relationships to each other whereby there are selectively produced at said output signal processing means signal parameters determinative of a condition of said range hydrophone.

5. The system as defined according to claim 4 but further characterized by said switching means comprising:
a plurality of multi-terminal switch elements mounted in cascade between said input and output means;
an intermediate one of said switch elements having a plurality of dummy terminals and a grounded contact arm; and
means connecting the dummy terminals of said one switch element to terminals of the other switch elements to thereby prevent stray coupling between said input and output means.

6. The system as defined according to claim 4 but further characterized by each of said hydrophones having an essentially cylindrically symmetric radiation pattern.

7. The system as defined according to claim 4 but further characterized by said input signal drive means comprising an audio oscillator, and a transformer coupling said audio oscillator to said switching means.

8. The system as defined according to claim 5 but wherein said switching means comprises means for actuating the contact arms thereof in unison.

9. A hydrophone system including a range hydrophone capable of being calibrated in its operational underwater station from a shore station having a power supply remote control unit and signal processing equipment, said unit comprising:
a watertight housing;
an array of three essentially identical hydrophones including said range hydrophone and additional first and second hydrophones mounted from each other and sufficiently close together to eliminate natural reflecting surfaces intervening therebetween;
input calibration signal driving means connected to the power supply;
output amplifying means connected to said signal processing equipment; and
switching means for selectively connecting each of said hydrophones to said input means and for connecting said range hydrophone and said first hydrophone to said output means in predetermined driving and detecting relationships to each other whereby there are selectively produced at said output signal processing equipment signal parameters determinative of a condition of one of said hydrophones.

10. The system as defined according to claim 9 but further characterized by a first impedance high in comparison with that of said range hydrophone connecting said input means and range hydrophone to ground and a second precision impedance connected between the output of said additional first hydrophone and ground.

11. The system as defined according to claim 10 but further characterized by the parameters so produced being the voltage output of the range hydrophone when the additional second hydrophone is driven by the calibration signal; the output voltage of said additional first hydrophone when driven by said second hydrophone, the voltage output of the range hydrophone when said additional first hydrophone is driven by the calibration signal through said precision impedance, and the current of said additional first hydrophone when driven through its precision resistance.

12. The system as defined according to claim 9 but further characterized by said switch means including means for connecting said range hydrophone in series with said input, amplifying and output means whereby the gain of said amplifying means may be calibrated.

13. The system as defined according to claim 9 but further characterized by said system further comprising electrostatic shielding means located between said input and output means for eliminating at least some stray coupling therebetween.

14. The system as defined according to claim 9 but further characterized by the radiation pattern of each of said hydrophones being essentially cylindrically symmetric, and the radiation axes of said hydrophones being parallel.

15. The invention as defined according to claim 10 but further characterized by the impedance and transmission characteristics of said hydrophones being essentially identical.

16. The system as defined according to claim 9 but further characterized by said switching means comprising:
a plurality of multi-terminal switch elements mounted in cascade between said input and ouput means;
an intermediate one of said switch elements having a plurality of dummy terminals and a grounded contact arm;
and means connecting the dummy terminals of said intermediate switch element to terminals of the other switch elements to thereby prevent stray coupling between said input and output means.

17. The system as defined according to claim 16 but further characterized by each of said switch elements being in the form of a wafer, and means for actuating said switch elements in unison whereby corresponding terminals of said switch elements are simultaneously engaged.

18. A hydrophone unit which is capable of being calibrated in situ comprising:
a base member, an array of three hydrophones, including one hydrophone to be calibrated mounted on said base member, said hydrophones being equidistant from each other;
said hydrophones being located sufficiently close together to prevent natural reflecting surfaces from intervening therebetween;
each of said hydrophones having a cylindrical symmetric radiation pattern;
and switch means for selectively connecting each of said hydrophones in predetermined driving and detecting relationships to each other;
whereby when an input calibration signal is fed to said switching means, output signal parameters are produced which are determinative of a condition of said one hydrophone to be calibrated.

19. The unit as defined according to claim 18 but further characterized by said switching means comprising actuating means therefor controllable from a remote station.

20. The unit as defined according to claim 18 but further characterized by said switching means including dummy switch means for isolating stray coupling between input and output signals appearing in said switch means.

21. The unit as defined according to claim 18 but further characterized by said switch means including means for connecting said one hydrophone directly to output utilization means so that said one hydrophone may be employed operationally.

22. The system as defined according to claim 10 but further characterized by having a base member, said hydrophone being mounted on said base member and forming the apex of an equilateral triangle;
said switching means being arranged so that the transmission and receiving between said hydrophones being along the three sides of said triangle.

References Cited by the Examiner

UNITED STATES PATENTS

| | | | |
|---|---|---|---|
| 2,451,509 | 10/1948 | Owsley | 73—1 |
| 2,535,686 | 12/1950 | Lawrence | 200—11 X |
| 3,019,412 | 1/1962 | Crawford | 340—7 |

OTHER REFERENCES

Kinsler et al., Fundamentals of Acoustics, John Wiley & Sons, New York, 1950, pages 356 to 358 relied upon.

LOUIS R. PRINCE, *Primary Examiner.*

S. C. SWISHER, *Assistant Examiner.*